United States Patent [19]
Forbes

[11] 3,742,461
[45] June 26, 1973

[54] CALIBRATE LOCK-ON CIRCUIT AND DECOMMUTATOR

[75] Inventor: Donald F. Forbes, Oakton, Va.

[73] Assignee: The United States of America as represented by the Secretary of the Navy, Washington, D.C.

[22] Filed: Feb. 22, 1972

[21] Appl. No.: 228,187

[52] U.S. Cl. ................ 340/172.5, 178/69.5, 328/63
[51] Int. Cl. ............................................. H04l 7/00
[58] Field of Search ................ 340/172.5; 178/69.5; 328/63

[56] References Cited

UNITED STATES PATENTS

| | | | |
|---|---|---|---|
| 3,419,679 | 12/1968 | Elvis et al. | 178/69.5 |
| 3,546,703 | 12/1970 | Kurth | 178/69.5 |
| 3,601,537 | 8/1971 | Gueldenpfenning | 178/69.5 |
| 3,671,873 | 6/1972 | Haas et al. | 178/69.5 |
| 3,544,717 | 12/1970 | Smith | 178/69.5 |

*Primary Examiner*—Paul J. Henon
*Assistant Examiner*—Mark Edward Nusbaum
*Attorney*—R. S. Sciascia, Arthur L. Branning et al.

[57] ABSTRACT

The invention relates to digital circuitry for automatically upon receipt of a calibrate signal locking on to received analog data and decommutating said data for further processing. The circuit locks on to the beginning of each frame and maintains this lock on while a counter counts the segments of the frame and resets the circuitry for the receipt of a new frame upon the end of the previous frame. The digital data is comprised of 32 segments the first two of which are approximately all zeros and approximately all ones. The remainder of which are at varying digital levels between all zeros and all ones. The calibrate circuit looks for the calibrate signal, all zeros and then for all ones before allowing the data to go on for further processing in the digital to analog converter.

2 Claims, 3 Drawing Figures

CALIBRATE LOCK-ON CIRCUIT AND DECOMMUTATOR

This application is related to application Ser. No. 228,186 filed by the same inventor for a digital circuit for synchronizing a receiving system with received data.

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

The invention uses comparators to indicate when a calibrate signal, all zeros followed by all ones, has been received. A counter keeps track of the segment count and resets the comparators at the end of each frame. The circuit further supplies a signal to a synchronizing circuit which controls the master clock.

BACKGROUND OF THE INVENTION

With the development of satellites and other unattended systems which may periodically transmit data in bunches or frames followed by spaces, wherein each segment of the frame represents some analog value, a system was needed which could receive the signal and remove the data therefrom. Such a system had to be automatic in nature responding only to the received signal. Unattended systems often use less than precision clocks in favor of reliability. Therefore the receiving system must be able to synchronize with data which may not be sent at the same rate as the receiving master clock. Such a system is shown in FIG. 1.

STATEMENT OF OBJECTS

Therefore it is one object of the invention to provide an automatic lock on circuit.

Another object is to provide an automatic lock on circuit which provides the address of each bit of information in the frame.

DESCRIPTION OF THE PREFERRED EMBODIMENT

Figures 1, 2:
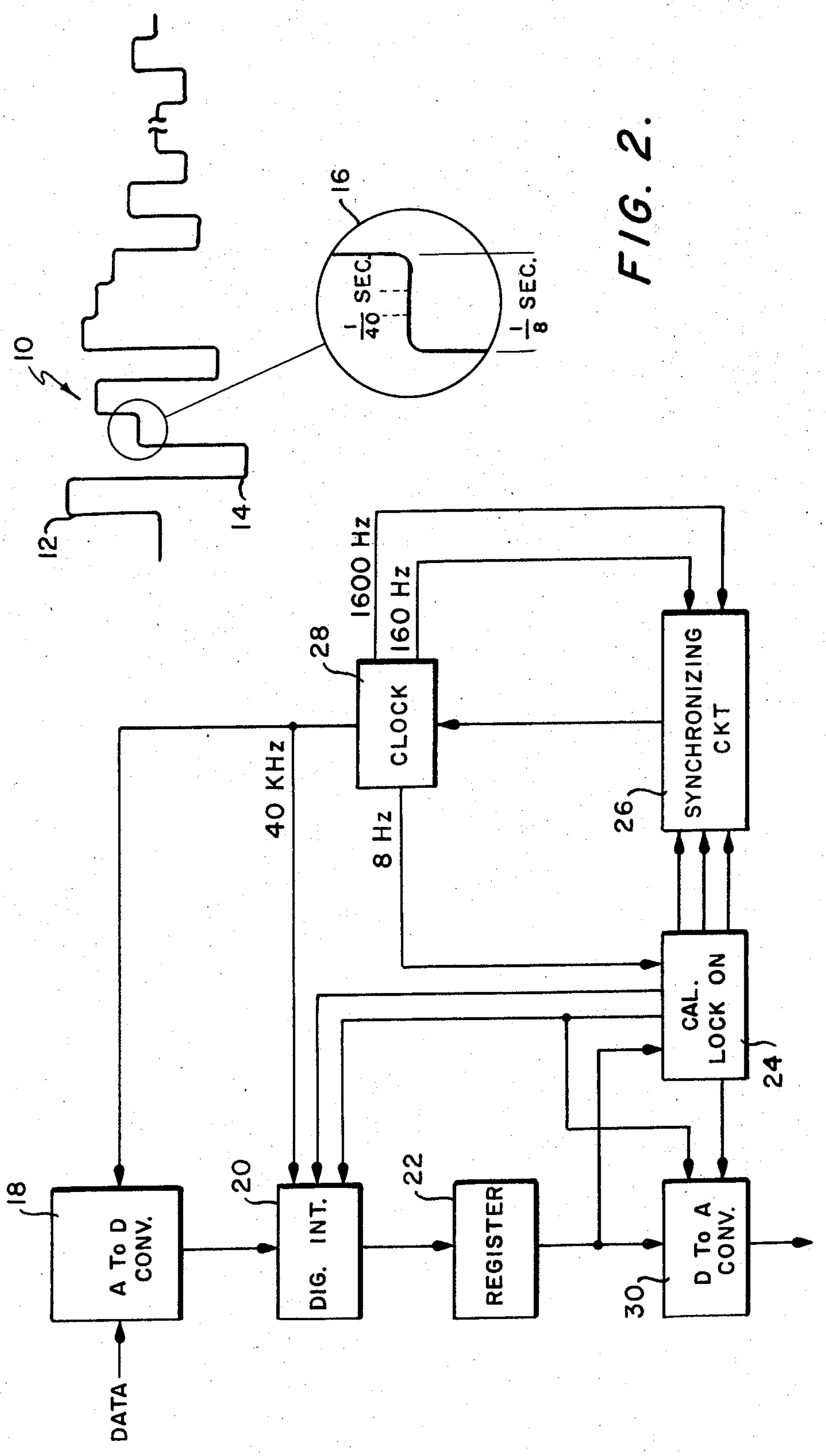
FIG. 1 shows the overall system for receiving data.
FIG. 2 shows the analog data.

Referring to FIG. 2, the data waveform 10 comprises a calibrate signal followed by analog data of varying amplitudes which for a frame. The calibrate pulse is in essence an analog indication of a full scale reading in one direction followed by an analog full scale reading in the other direction. That is pulse 12 is a reading of analog zero while 14, is a reading of analog full scale. These pulses 12 and 14 are used to trigger the calibrate and lock on circuitry. The waveform 10 comprises calibrate pulses 12, 14 plus 30 other segments of data each segment giving a reading of some function of satellite operation say, battery voltage while another segment might be giving current draw from the battery. Thus each segment must be addressed as to its position in the data waveform or frame so that it can be correlated by further processing equipment with other data. The frame is 32 segments numbered 0–31. The data waveform 10 is ideally sampled at some point near the center of each segment as the waveform is slightly rounded at the beginning and end of each segment, note exploded segment. Each segment has a width of approximately ⅛ sec and is sampled over 1/40 sec. Now referring to FIG. 1, the data waveform 10 is fed into a A to D converter 18 where the data segments are converted from analog to digital words of say 10 bits at the rate of 40 thousand samples per second. These samples are fed to a digital integrator 20 which integrates 1000 samples in approximately 1/40 sec, at the end of each sampling period the output, an average of these 1000 samples is dumped into register 22. The digital integrator 20 continues to sample starting again at the end of each sampling period until the calibrate lock on circuit 24 receives an indication of all zeros (i.e. the 10 bit digital word reads all zeros). Thereafter the digital integrator 20 is triggered an ⅛ sec later in the next segment, and again in the next segment until the end of the frame where the digital integrator 20 is again allowed to free run, continue to sample, by the calibrate lock on circuit 24 until the beginning of the next frame and proper calibrate of all zeros in that next frame. The calibrate lock on circuit 24 receives the output of register 22 as digital words of 10 bits in length. During the search mode the calibrate lock on circuit is looking for all zeros followed by all ones. Upon receipt of all zeros a pulse is generated indicating the receipt of all zeros. The all zeros pulse is fed to the synchronizing circuit 26 and is compared in phase with an 800 Hz clock pulse also fed to the synchronizing circuit 26 from clock 28. The phase difference between these pulses is then used to control the clock frequency such that the clock 28 and the zeros pulse will be synchronized.

On the receipt of all ones, following all zeros, by the calibrate lock on circuit 24, the digital integrator 20 is no longer allowed to free run but is started every ⅛ second. The integrator 20 then, integrates 1000 samples and stops dumping the average into register 22. Also at this time the D to A converter 30 is no longer inhibited by the calibrate lock on circuit 24, thus, the D to A converter 30 may convert the digital output of the register 22. The calibrate lock on circuit 24 also furnishes the address (0–31 count) of each bit of data in each frame so that they may be correlated for display or further processing. The D to A converter 30 output is connected to such further processing or display equipment not shown. Furthermore, it should be noted that the A to D converter 18, digital integrator 20, and the D to A converter 30 are well known in the art and typical of the devices disclosed in the "Digital Equipment Corp. Handbook," position logic division, copyright 1969.

Figure 3:
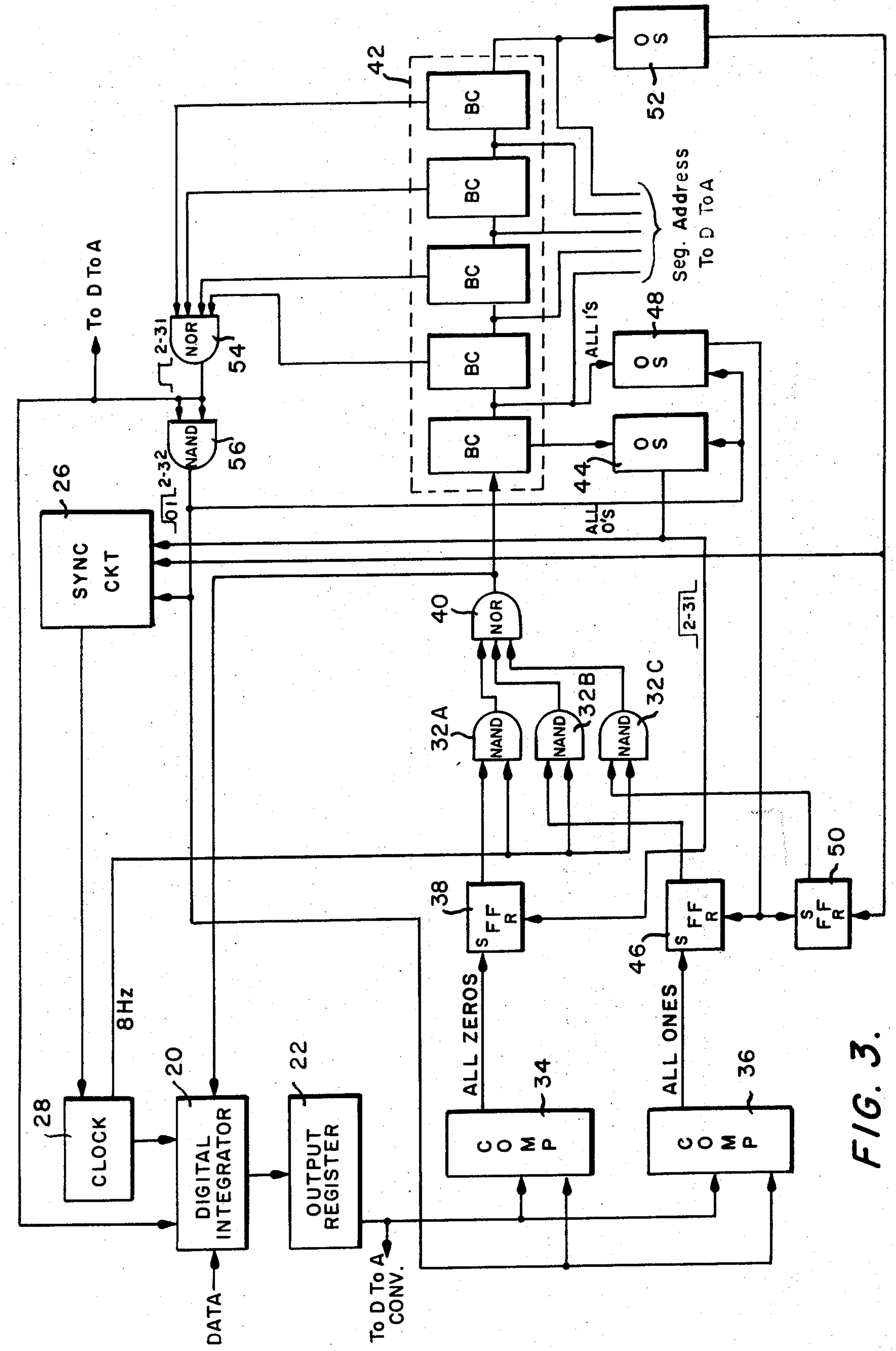
FIG. 3 shows the calibrate lock on circuit.

Referring to FIG. 3 which shows the calibrate lock on circuit 24, the clock 28 is shown supplying 40 kHz to the digital integrator 20 and 8 Hz to NAND gates 32A, B and C. Digital data from the A to D converter 18 is supplied to integrator 20, the output of which coupled to register 22. At the completion of each average by the integrator 20 the average is dumped into register 22 and fed to the D to A converter 30, and the all zero and all ones comparators 34 and 36 respectively. Comparators 34 and 36 are inhibited from operation except during the 01 count of the segment counter 42. Upon receipt of all zeros flip flop 38 is set and allows the 8 Hz clock pulse to pass through NAND gate 32A, NOR gate 40 and to trigger the least significant stage of segment counter 42 from a binary zero to binary one which triggers one shot 44 and gives the indication of all zeros which resets flip flop 38 and is coupled to the synchronizing circuit 26 to be compared with the clock phase. The calibrate lock on circuit 24 remains in this state until all ones is received by comparator 36, usually in the same frame but it may be in a later frame. The all ones comparator 36 sets flip flop 46 allowing the 8 Hz clock pulse to pass through NAND gate 32B and NOR gate 40 to trigger counter 42 from a binary one to a binary two. The Negative transition of the output the least of significant counter stage triggers the all ones one shot 48. The output of which resets flip flop 46 and sets flip flop 50. Flip flop 50 allows the 8 Hz pulses to pass through NAND gate 32C and NOR gate 40 to trigger counter 42 and to start digital integrator 20 which is inhibited from free running. Counter 42 continues to count the 8 Hz pulses until 31 have been received, which should indicate the end of a frame. The last, most significant, stage of the counter 42 triggers the end count one shot 52 which generates a reset pulse which is fed to the synchronizing circuit 26 to reset the circuits in the search mode. The reset pulse further resets flip flop 50 inhibiting the counting of further clock pulses. The calibrate lock on circuit 24 is now in the search mode awaiting all zeros out of the register 22. The "1" outputs of all the stages of the counter 42 are fed to the D to A converter 30 though not converted the address of the segments passes on to the further processing equipment along with the analog output of D to A converter 30. The four most significant stages of the counter have their "0" outputs connected to NAND gate 54 giving an allow gate to the D to A converter 30 and an inhibit gate to digital integrator 20 whenever the count is between 2 and 31. The D to A converter 30 is allowed to operate between a count of 2 to 31 while the digital integrator is inhibited from free running and must be started by segment count output of NAND gate 40. The output of NAND gate 54 is inverted by NAND gate 56 to provide an indication of a 0 to 1 count. This "01" count gate allows the all zeros and all ones one shots 44, 48 and the comparators 34, 36 respectfully to operate during the search mode. The "01" count gate is also fed to the synchronizing circuit 26.

Of course, many variations may be made in the circuitry, for example, in practice the comparators may be designed to detect only the most significant bits of the 10 bit word.

Obviously many modifications and variations of the present invention are possible in the light of the above teachings. It is therefore to be understood, that within the scope of the appended claims, the invention may be practiced otherwise than as specifically described.

What is claimed and desired to be secured by letters patent of the United States is:

1. A calibrate lock on circuit comprising:

analog to digital converter means for converting varying analog level segments, which comprise a frame of information, into separate digital word segments, said converter means including integrator means for integrating said digital word segments;

said frame being received at random times;

detecting means for detecting the beginning of said frames;

said detecting means being coupled to said converter means;

counting means connected to said detecting means for counting said digital word segments;

said integrator being responsive to the segment count of said counting means;

said counting means being connected to output means and including means for supplying said output means with the location of each segment in each frame;

said output means being connected to said converter means to receive said digital segments;

said output means including means for converting said digital segments to analog segments.

2. The circuit of claim 1 wherein said detecting means includes at least two comparators each of said comparators being responsive to particular digital words thereby detecting the beginning of said frames.

* * * * *